United States Patent [19]
Brauchitsch

[11] Patent Number: 5,499,453
[45] Date of Patent: Mar. 19, 1996

[54] SYNTHETIC RESIN TOILET FLANGE CUTTING TOOL

[76] Inventor: Nelson F. Brauchitsch, A-24 Campo Rey, Aibonito, Puerto Rico, 00705

[21] Appl. No.: 194,697

[22] Filed: Feb. 10, 1994

[51] Int. Cl.$^6$ ................................................. B23D 21/10
[52] U.S. Cl. ................................................. 30/105; 30/103
[58] Field of Search ............................. 30/103, 93, 105; 82/1.2, 82

[56] References Cited

U.S. PATENT DOCUMENTS

| | | | |
|---|---|---|---|
| Re. 29,803 | 10/1928 | Breese | 30/103 X |
| 3,406,449 | 10/1968 | Doerner | 30/107 |
| 3,911,574 | 10/1975 | Jones | 30/103 X |
| 4,424,629 | 1/1984 | Schott | 30/105 |
| 4,446,620 | 5/1984 | Velte | 30/96 |
| 4,455,746 | 6/1984 | Idzik | 30/106 |
| 4,467,682 | 8/1984 | Huggins | 82/73 |
| 4,577,406 | 3/1986 | Idzik | 30/103 |
| 4,601,223 | 7/1986 | Choby | 82/82 |
| 4,674,184 | 6/1987 | Anderson | 30/92 |
| 4,712,302 | 12/1987 | Diller | 30/107 |
| 4,779,496 | 10/1988 | Evans | 82/82 |

OTHER PUBLICATIONS

Holesaw; Vermont American Tool Co. Indian Creek Rd., PO Box 340 Lincolnton, NC 28093-0340 Tel (704)735-7464 Fax (704)736-8086.

*Primary Examiner*—Douglas D. Watts

[57] ABSTRACT

The herein referenced invention belongs in general relation to tubing cutters. The invention specifically relates to an internal tubing cutter, one which is lightweight and portable and adapted for cutting synthetic resin pipe and toilet flanges. The apparatus has a plurality of radially extensible and retractable cutting means (14), snub pins (24), guide channels (22), and connecting arbor (10). Several blades rotating perpendicular to the central vertical axis facilitate the means to shear the flanged drainage pipe. A reference disk (12) provides an adequate stop for the tool when depended into the downcomer, provides additional stability, and provides protection to the user from any airborne material.

3 Claims, 3 Drawing Sheets

SYNTHETIC RESIN TOILET FLANGE CUTTING TOOL

FIELD OF THE INVENTION

This invention relates to tubing cutters. More specifically, however, to an improved inside tubing cutter for synthetic resin material. Moreover it is an invention conveniently adapted for cutting synthetic resin toilet flanges such as molded from polyvinyl chloride (PVC) and enabling the removal of such toilet flanges from the downcomer.

DESCRIPTION OF THE PRIOR ART

Occasionally, a plumber, craftsman or layperson needs to extract a sleeved polyvinyl chloride (PVC) flange from an existing toilet installation. Ideally, the sleeved flange should be cut a little below the floor level, removing the entire sleeve and leaving only the downcomer. This operation facilitates capping off the sanitary drainage or affixing a new flange according to construction or remodeling plans. Many times as a compromise, the sleeved flange is cut flush with the floor.

A method, most generally employed in the trades, constitutes hacksawing the flange off, presumably flush with the floor. This operation proves cumbersome, labor intensive and generally leaves a slanted or uneven cut. Astoundingly, another commonly employed method uses a jigsaw to partition segments of the protruding flange and subsequently the worker breaks off the segments with a hammer and chisel leaving a jagged or rough edge below the floor on the sanitary discharge piping. Other methods, even more inadequate for accomplishing removal include, heating the joint with a blow torch until the burning and softened PVC flange is removed from the toilet drain. This is an awkward and unsure method since although PVC is a thermoplastic polymer, it may never lose its bonding properties to the adhesive employed, will begin to melt and burn when heated with a torch, and upon cooling and rehardening will not generally retain its original shape. All of these methods are disadvantageous because, more often than not, the floor must be broken or otherwise mutilated to achieve the desired cut. When the job is damaged beyond repair, the market makes available a design without a sleeve or otherwise a flat flange, for the exact reasons outlined above or when the work has been improperly done. This "fix" is generally not employed because professionals purposely try to avoid improperly affixed toilet flanges which could otherwise cause tilting of the toilet base, leaks, or other problems.

Heretofore, tools to perform similar functions have mostly incorporated methods for cutting pipe from the outside in. Examples of tools performing a similar function are: the hacksaw, the plumber's tubing cutter, vice grip type tubing cutters, ratchet type tubing cutters, and others. Internal tubing cutters such as those devices disclosed in U.S. Pat. Nos. 3,406,449; 4,712,302; 3,911,574 and Re 29,803, 4,577,406 exist but are generally hard to find and difficult to manipulate. Those in existence are not particularly adaptable to removing toilet flanges nor do they suggest the same.

Most of the prior art, such as the device in U.S. Pat. No. 4,712,302 which is a tool requiring some motive source, is intended for heavy duty applications, cumbersome, and not easily accessible to the general public at other than specialty stores or through manufacturers representatives, and then only for very specific applications. The inside tubing cutter in U.S. Pat. No. 3,406,449, requires manual periodic adjustment to maintain the pressure exerted by the cutting edge as the depth of cut increases and in order to effect a shearing action on the inside surface of the pipe. This causes uneven cutting and undulations of the material in the partially cut groove perpendicular to the axis of rotation of the implement. Thereby, these initial adjustments acting on the material require subsequent adjustments in other sections of the pipe and generally make it more difficult to rotate the cutter or may otherwise damage the cutting edge. The tubing cutter in U.S. Pat. No. 4,577,406, which is also an implement requiring a motive source to provide the required operating torque, lacks a description of what is to be considered an adequate stop. The tubing cutter in U.S. Pat. No. Re 29,803 is a tool for preparing a pipe so as to install toilet or drain fittings properly. The pipe cutter of U.S. Pat. No. 3,911,574 is an apparatus for cutting plastic pipe internally so that a portion of an end of the pipe can be removed but does not anticipate a solution as to how the tool should properly cup into a toilet flange for enabling its removal. Apparently, the ubiquitousness of toilet flanges and the uniqueness of how they are shaped has not been a compelling design criteria for pipe cutters until now.

SUMMARY

In summary, the herein invention should be considered a drill attachment tool specifically designed to perform the function of removing, from within, synthetic resin toilet flanges from sanitary installations. Accordingly, several objects and advantages of my invention are described below. It is an object of my invention to detail a compatible implement for easily enabling a person to effect a cut along the inner surface of a synthetic resin pipe. Another object of my invention is to provide a convenient, highly reliable, lightweight device, inexpensive to manufacture, which can be used by persons of almost any age or gender to remove toilet flanges in the usually limited space found in most bathrooms. The advantages of using my invention become clear when one considers that practically no manual labor is involved. In addition, although not specifically shown, it is anticipated that this cutter would be operated by rotating it at high speeds such as 2,000 or higher revolutions per minute. An arbor connected to an electric hand drill is the preferred apparatus for effecting such rotation. Said arbor, however, may be connected to any driving motor capable of providing torque and rotating it at the requisite speed.

Furthermore, it is an object of my invention to show that it is a comparatively safe means for removing a toilet flange, when constrained spaces are involved, as opposed to blow torches or wielded hammers. An advantage of my invention is that the flooring or base does not have to be broken since cutting is accomplished from the inside of the tube below the flooring, thus saving time and repair costs. It is an object of my invention to automatically control cutting pressure. It is a further object of my invention to eliminate the inexactitude of periodic manual pressure adjustments along the cutting circle since this is accomplished automatically by the action of centrifugal force and the high speed revolutions which act on the radially extensible cutting blades which are a part of my invention and an improvement over anything currently in existence. To this effect, it is an object further still, that this implement may serve to extract toilet flanges of varying diameters within the dimensional limitations of the cutter. It is an additional object of my invention to provide an adequate stop for the lengthwise segment depended into a drainage tube. This stop additionally acts as a stabilizer and shield protector for the user. Further objects and advantages of my invention will become apparent from a consideration of the drawings and the ensuing description of it.

DESCRIPTION OF THE PREFERRED EMBODIMENT

Figure 1:
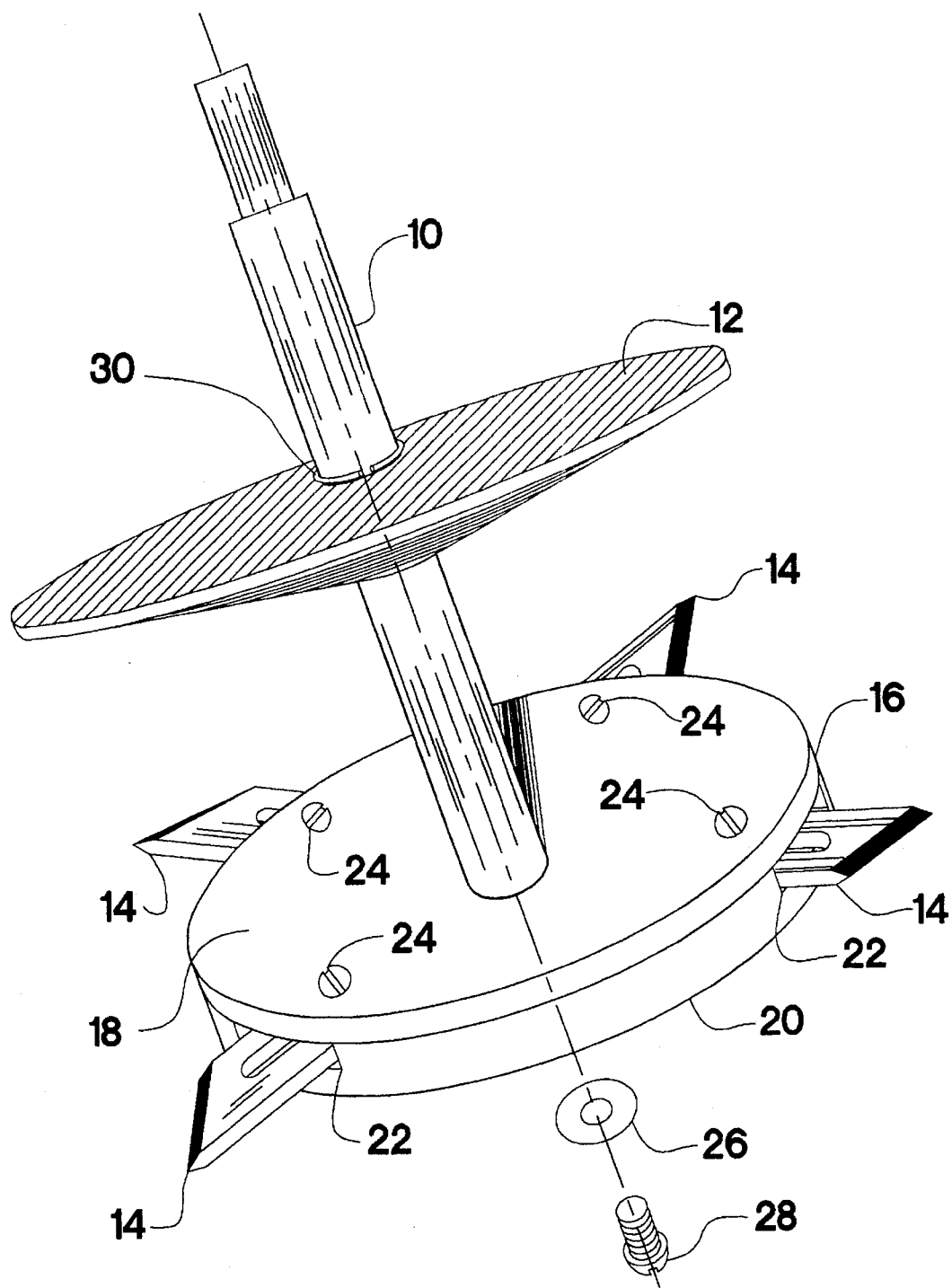
FIG. 1 Perspective view of synthetic resin toilet flange cutting tool.

In FIG. 1, a cutting circular body (16), corresponding in volume to a flat disk, comprising two pairs of equidistant cutting means (14) and centrally bored is secured onto a cylindrical arbor (10) by means of a threaded bore with screw and washer assembly (26) and (28) at bottom. Said arbor, which the inventor expects would be connected to some motive means providing the desired revolutions, has an upper shank of smaller diameter than the rest and which would be connected to said motive means.

The circular body (16) consists of an uppermost member (18) and lowermost member (20). The lowermost member has two pairs of equidistant guide channels (22) where the cutting means (14) are held in place. The guide channels (22) are so constructed to allow sufficient clearance widthwise to permit the cutting means (14) to be slidable outwardly. But not excessively, such that they would prolapse if pressured against the direction of rotation from the outside. The overall length of the guide channels permit the cutting means to be extensible and retractable radially. The depth of the channels allow for sufficient clearance but do not permit the cutting means to nutate from the horizontal. The uppermost member (18) has four borings exactly coinciding with the center of each guide channel (22), widthwise, and located not far from the edge of the disk where screws (24) are used to fix the uppermost member (18) conveniently and congruently to the lowermost member (20).

Figure 2:
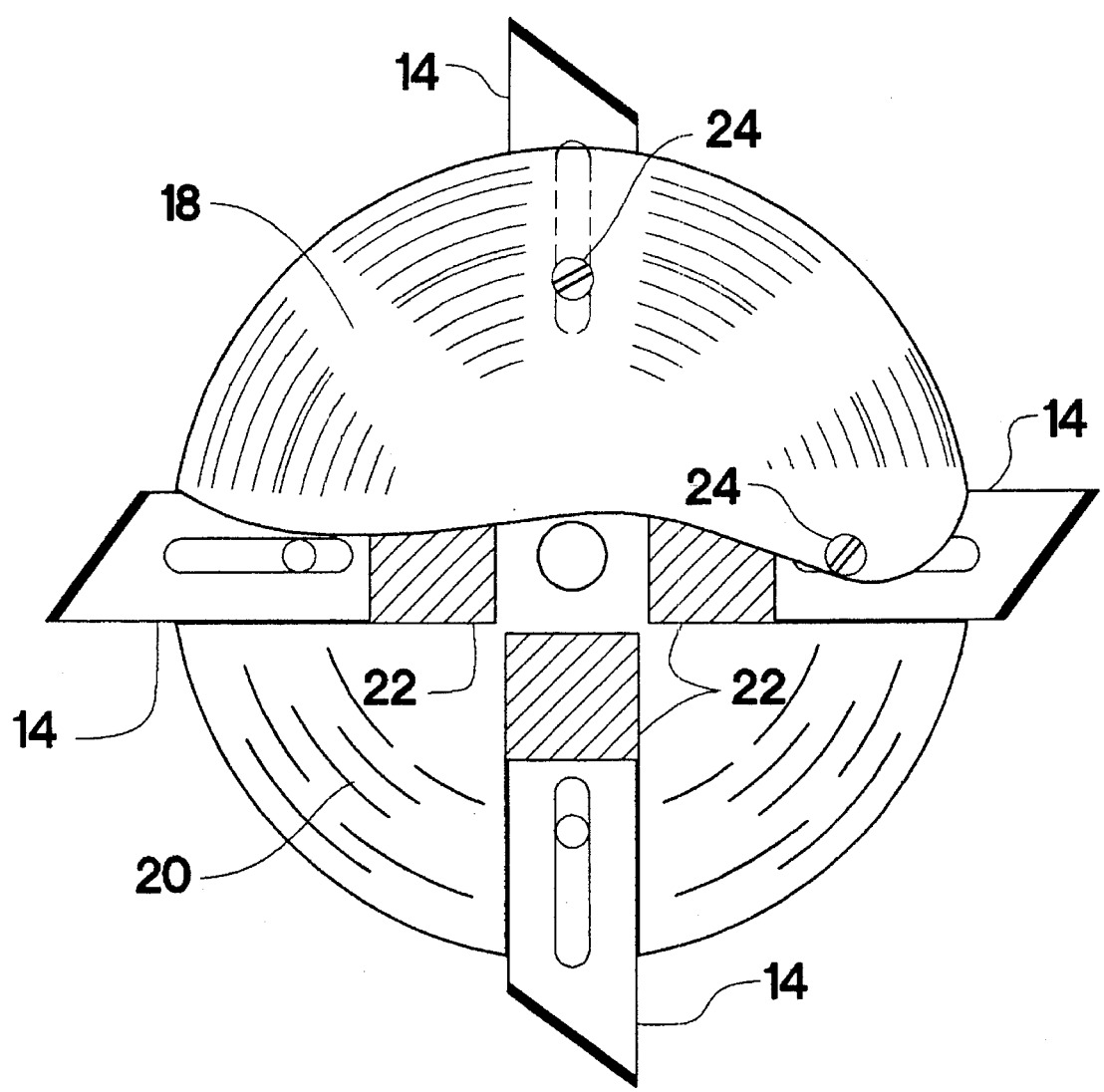
FIG. 2 Top view showing upper and lower halves.
Figures 3A, 3B:
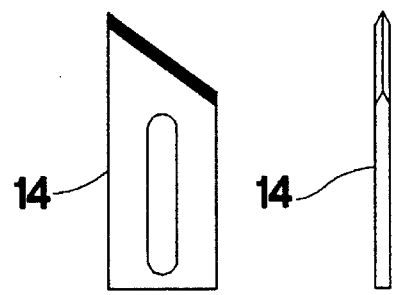
FIG. 3A Perspective of preferred cutting means.
FIG. 3B Side view of preferred cutting means.

Referring specifically to FIG. 2, before the screws (24) are tightened in place, cutting means (14) which are four flattened rectangular metallic fillets, obliquely cut at one end which can be either filed sharp or saw toothed such as shown in FIG. 3A and FIG. 3B, are each placed in the corresponding guide channels (22) on the lowermost member (20), and intermediate to the uppermost member (18), with the oblique end facing out and with each shorter parallel side oriented clockwise as viewed from above. Furthermore, each metallic fillet has a prolate cutout lengthwise in the center. The screws (24), effectively serve as snub pins for the cutting means which are rapidly emergent when the tool is being operated due to the continuous centrifugal force at each revolution.

Figure 4:
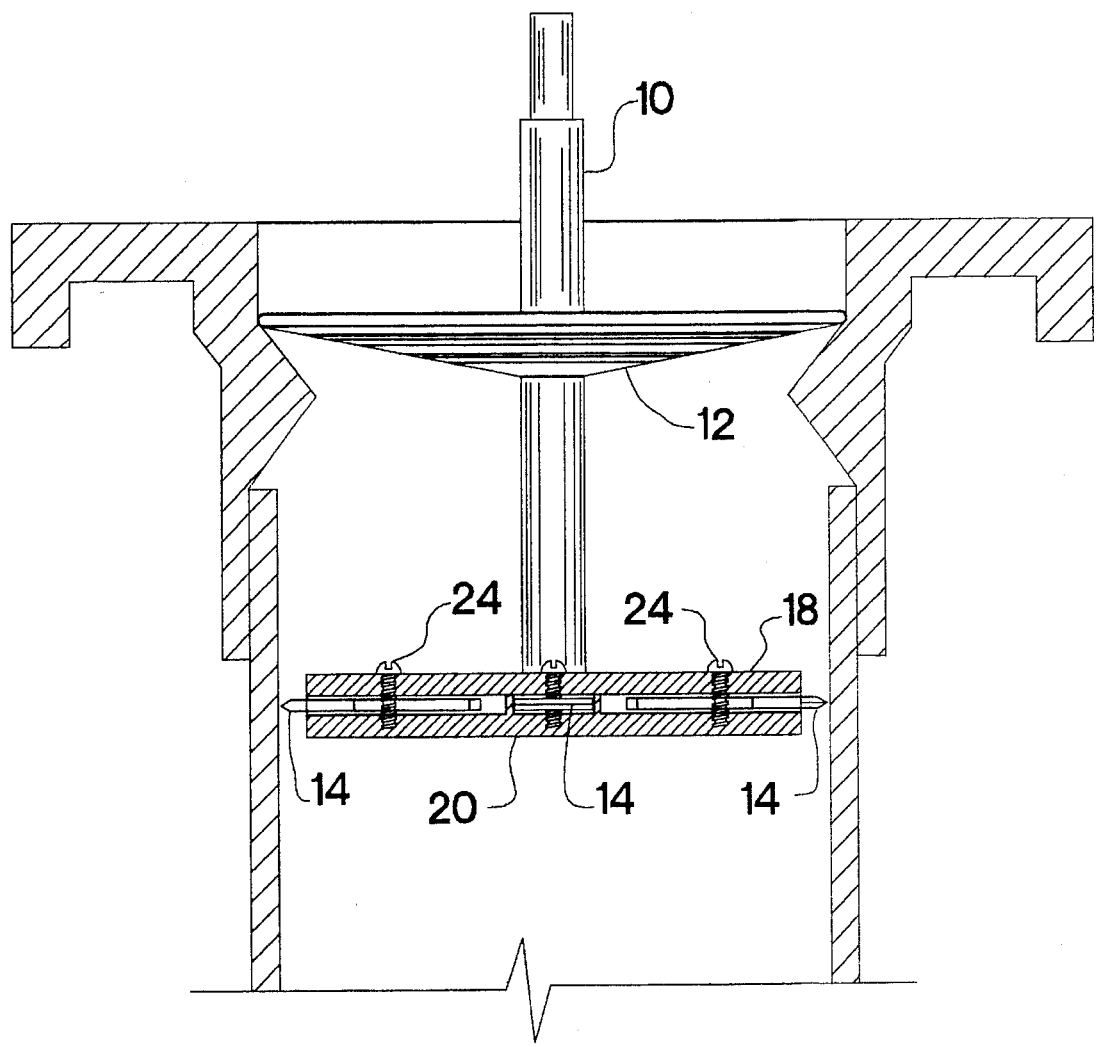
FIG. 4 Orthographic view as seen depended into flange.

Finally, in FIG. 4 a reference disk (12) is rotatably secured distal to the upper circular body member (18) along the central vertical axis by means of two clip washers (30) above and below said reference disk, leaving enough distance at the tip to connect to motive means. Said reference disk (12) serves at least three purposes: first, it correctly determines the lengthwise distance which the apparatus should depend into the drainage tube and hence a suitable distance for making future repairs to the downcomer, since it would be undesirable to cut much below the previously fitted sleeve, secondly, it provides stability and centers the apparatus while rotating at high revolutions, and thirdly, it provides protection from any airborne material which might result while cutting.

The manner of connecting the synthetic resin toilet flange cutting tool to the preferred motive source is identical to that for other drill attachment tools in present use. By way of operation, said arbor attaches a circular body where radially extensible cutting blades are located and similarly attaches a reference disk to any drilling apparatus which thereby imparts various rotations in a manner convenient to the user and converts the exerted centrifugal force on the cutting blades into cutting action at the point where the cutting blades contact the inner surface of the pipe or flange. Removal of the flange and tool is easily accomplished once the centrifugal force no longer acts on the extensible blades, permitting their retraction.

The component parts have been shown and described. Thus the reader can see that my invention provides a highly reliable, safe, lightweight, yet economical to manufacture device which can be used to perform an otherwise difficult task. While my above description contains many specificities, these should not be construed as limitations on the scope of the invention, but rather as an exemplification of one preferred embodiment thereof.

Many other variations are possible. For example, flanges or pipe made in plexiglass or any other synthetic resin or cellulosic material such as used in the textile industry can be cut this way. By substituting the cutting means with any element such as a rectangular bar oriented along the diagonals within the guide channels and cut obliquely leaving a diamond shaped cutting edge, other heavier materials may be cut. Similarly, in process machinery, circular cutting blades acting at much higher revolutions may also be attached to an arm which, like in this invention, extends radially and intermediate to both body members.

In the course of inventing the apparatus I sought to make the cylindrical shank adjustable lengthwise. Although attractive, it later resulted undesirable for the task at hand since for convenience sake the downcomer should be cut as close to the floor level as possible allowing it to be subsequently recapped or flanged easily. It hardly seemed necessary to adjust the length of the shaft between the reference disk and circular body more than a maximum of two inches corresponding to the nominal length of a sleeve found in most toilet flanges. Nevertheless, an adjustable shank could be made for an intended purpose other than that described herein. Accordingly, the scope of the invention should be determined not by the embodiment (s) illustrated, but by the appended claims and their legal equivalents.

I claim:

1. An electric hand drill attachment tool for removing toilet flanges from sanitary installations comprising a cylindrical shank serving as arbor of convenient length and having a threaded bore at bottom and whereby cutting circular body members are centrally secured by means of a threaded screw and washer, a reference disk of greater diameter than the circular body, centrally bored, affixed to the cylindrical shank by upper and lower clip washers and distal to the circular body along the central vertical axis, said reference means is generally shaped like a saucer to cup-snugly-into the generally bowl shaped inner geometry of most toilet flanges and for ease of rotational movement when pressured against the pipe or flange to be cut, said circular body members forming a lower circular body member of smaller diameter than the pipe to be cut, being centrally bored and having a plurality of independent equidistant guide channels all extending from a convenient inner radius to the edge of the circular body member and therethrough along a horizontal plane, said guide channels each additionally comprising a threaded smaller diameter bore central to the shorter distance of said guide channels and distal to the central bore of the circular body lengthwise extending through the plate at the guide channels, an upper circular body member of equal diameter than the lower body member, centrally bored additionally having a plurality of threaded bores corresponding in relation to those claimed extending through the plate at the guide channels, a plurality of independent cutting means, corresponding in number to said guide channels, the independent cutting means each having a prolate cutout lengthwise and central to said means, furthermore said cutting means are generally flat made of metal and rectangularly shaped having one oblique shorter distance which can be machined to be filed sharp, all similarly on the same face, or all similarly saw toothed, a plurality of tightening screws corresponding in number and location to the threaded smaller diameter bores in the upper and lower members serving to assemble the circular body and as snub pins extending transversely through the prolate cutout of the cutting means assembled intermediate to both body members, all assembled on the same plane serving to effect a singular cutting action by combining the independent cutting force of each said means, and maintaining a constant pressure along the cutting circle.

2. The apparatus according to claim 1 wherein said reference means is located not less than 2 inches but not more than 6 inches from said cutting circular body along said shank.

3. The apparatus of claim 1 wherein said reference means is generally made of metal but which may be made of rigid plastic.

* * * * *